United States Patent
Davis

[15] 3,677,065
[45] July 18, 1972

[54] TRANSPARENT FLUID SAMPLER PERMITTING PARTICULATE ANALYSIS IN AN ASSEMBLED CONDITION

[72] Inventor: James G. Davis, Satellite Beach, Fla.
[73] Assignee: The United States of America as represented by the Secretary of the Air Force
[22] Filed: Oct. 14, 1970
[21] Appl. No.: 80,704

[52] U.S. Cl. ............................................73/28, 116/114 R
[51] Int. Cl. ..................................................G01n 15/02
[58] Field of Search..................73/421.5 R, 28; 55/270, 274; 23/253 TP; 116/114 AH

[56] References Cited

UNITED STATES PATENTS 3,088,811   5/1963   Jones ................................23/253 TP

OTHER PUBLICATIONS

Aquadex Moisture Indicator, Bulletin MI– 321, application of Pall Trinity Micro Corporation, Cortland New York

*Primary Examiner*—S. Clement Swisher
*Attorney*—Harry A. Herbert, Jr. and Arsen Tashjian

[57] ABSTRACT

A fluid sampler having a cover assembly with an inlet and a transparent top and a cylinder-like bottom portion open at the upper end and closed at the lower end, except for an outlet. A suitable filter is disposed in the bottom portion over the outlet. The cover assembly and the bottom portion are removably connected and form a cavity. The fluid to be filtered is introduced into the fluid sampler through the inlet; enters the cavity; passes through the filter; and exits through the outlet. The contaminants are left on the filter and may be analyzed or counted by suitable means, such as a microscope, through the transparent top, without removal of the filter from the fluid sampler.

4 Claims, 4 Drawing Figures

PATENTED JUL 18 1972 3,677,065

INVENTOR.
JAMES G. DAVIS
BY Harry A. Herbert Jr.
and
Arsen Tashjian
ATTORNEYS

TRANSPARENT FLUID SAMPLER PERMITTING PARTICULATE ANALYSIS IN AN ASSEMBLED CONDITION

BACKGROUND OF THE INVENTION

This invention relates to a fluid sampler for use in the filtration of fluids and, more particularly, to a fluid sampler which is transparent and which permits particulate analysis while the sampler is in an assembled condition.

Typical prior art fluid samplers, with filter disc, used in the filtration of fluids for the purpose of particulate analysis, require disassembly and exposure of the filter disc to the outside environment to conduct the analysis. This necessitates disassembly in a controlled clean room. If the disassembly does not take place in a controlled clean room, there is a risk of introducing extraneous contaminants. As a result, neither a background count, i.e., an initial count, or a final count of the particulate can be accurately obtained, unless disassembly and analysis take place in a controlled clean room which may be unobtainable or, at least, inconvenient.

It is obvious, therefore, that there is a current need for a fluid sampler, with filter disc, which will permit a precise particulate analysis without disassembly of the sampler.

I have invented such an apparatus and, thereby, I have significantly advanced the state of the art. In addition, my invention allows the indefinite retention, if necessary, of a particulate sample in its own sealed environment.

SUMMARY OF THE INVENTION

This invention permits the obtaining of a precise particulate analysis of a fluid sample without the need for a controlled clean room environment.

The principal object of this invention is to provide apparatus for a precise particulate analysis of a fluid while the apparatus is in an assembled condition; and, thereby, permits the particulate analysis to be performed in any convenient location.

A related object is to allow the indefinite retention, if desired or if necessary, of a particulate sample in its own sealed environment.

Another related object is to allow packaging of a sterilized filter disc in a holder which does not require subsequent opening or reopening.

These and other objects of this invention will become readily apparent after a consideration of the description of the invention and reference to the drawings.

DESCRIPTION OF THE EMBODIMENTS

Figure 1:
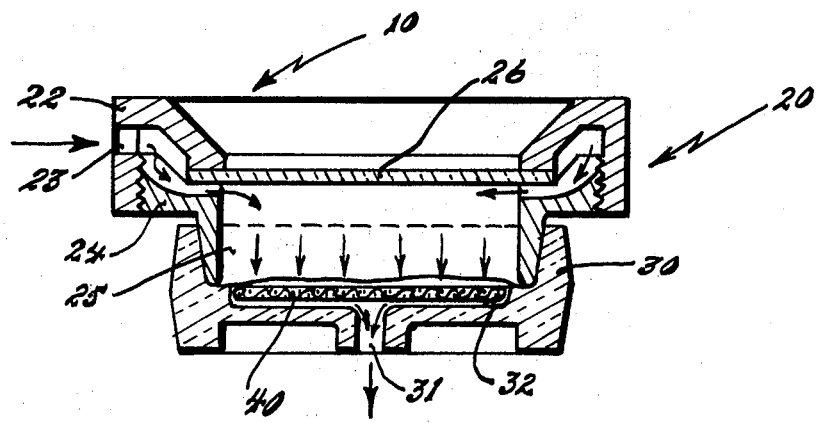
FIG. 1 is a side elevation view, in schematic form and in cross-section, of a preferred embodiment of the invention.

As to the preferred embodiment Shown in FIG. 1:

With reference to FIG. 1, therein is shown, in schematic form and in cross-section, a side elevation view of the preferred embodiment 10 of the invention.

The preferred embodiment 10, a filter holder or fluid sampler, includes a top portion assembly or cover 20, comprising a female part 22, a male part 24 in threaded connection with said female part 22, and a transparent disc 26 bonded, or otherwise affixed, to the inner periphery of female part 22 and disposed between female part 22 and male part 24. Female part 22 and male part 24 may be made of any suitable metal, such as steel or aluminum. Transparent disc 26 is made preferably of glass. Female part 22 is torus-like in configuration; is hollow; is threaded at its lower end on the internal surface; and has a suitably positioned aperture or inlet 23 to permit the ingress, and flow, of the fluid to be filtered. Male part 24 is cylinder-like in configuration; is hollow; is threaded at its upper end on the external surface; and is open-ended. Female part 22 and male part 24 mate and unite to form two concentric cylinders of different diameters, with the larger diameter end on top, and the smaller diameter end on the bottom.

Again, with reference to FIG. 1, also shown therein is bottom portion 30 of embodiment 10. Said bottom portion 30 is cylinder-like in configuration; is open at one end, i.e., the upper end, and is closed at the other end, i.e., the lower end, except for an aperture or outlet 31 therein to permit the egress of the filtered fluid from the filter holder 10; and, has a cylinder shaped recess 32.

With reference again to FIG. 1, the inner diameter of the open upper end of bottom portion 30 is slightly larger than the outer diameter of the bottom open end of male part 24, so that the bottom open end of male part 24 fits snugly into the open upper end of bottom portion 30. When, in fact, male part 24 and bottom portion 30 are removably connected or united to form a single integrated unit, as shown in FIG. 1, a cavity or hollow chamber 25 is formed, having an inlet 23 and an outlet 31.

An appropriate filter 40, such as a suitable microporous filter, is positioned in a flat mode in recess 32 of bottom portion 30.

The flow of the fluid to be filtered and of the filtered fluid is as indicated by the arrows in FIG. 1.

Figure 2:
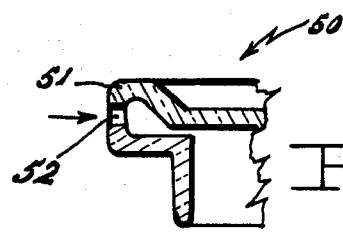
FIG. 2 is a side elevation view, also in schematic form and in cross-section, of a portion of another preferred embodiment of the invention.

As to the preferred embodiment Shown in FIG. 2:

In FIG. 2 is shown, in a side elevation view, in schematic form, and in cross-section, a portion of another preferred embodiment 50 of the invention. Shown therein is a portion of a one-piece cover 51 with inlet 52. Cover 51 may be made of any molded transparent plastic, such as polystyrene or Tenite, the trade-name of Eastman Kodak Co. for a cellulose acetate plastic. When cover 51 is made of such material, it may be disposed of after use because of its very low cost.

Figure 3:
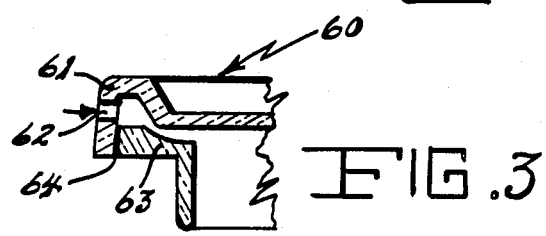
FIG. 3 is also a side elevation view, in schematic form and in cross-section, of a portion of still another preferred embodiment of the invention; and, FIG. 4 is also a side elevation view, also in schematic form and in cross-section, of a portion of yet another preferred embodiment of the invention.

As to the preferred embodiment Shown in FIG. 3:

In FIG. 3 is shown a side elevation view, in schematic form and in cross-section of still another preferred embodiment 60 of the invention. Member 61 with inlet 62 is bonded to, or is otherwise permanently joined with, member 63 at 64 to form a structurally integrated cover. Members 61 and 63 are preferably made of a transparent moulded plastic and the cover formed by their joining is disposable.

Figure 4:
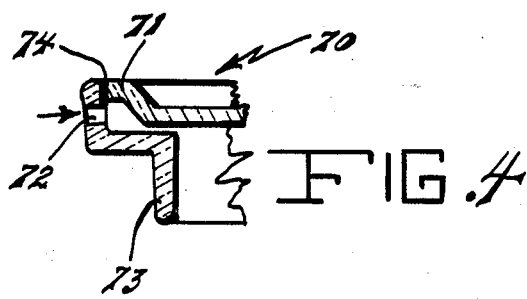

As to the preferred embodiment Shown in FIG. 4:

A portion of yet another preferred embodiment 70 of the invention is shown in FIG. 4 in a side elevation view, in a side elevation view, in schematic form and in cross-section. Transparent plastic members 71 and 73, with inlet 72, are bonded or are otherwise joined at 74 to form a one-unit cover which is disposable.

MODE OF OPERATION OF THE PREFERRED EMBODIMENTS

All of the preferred embodiments of my invention (10, FIG. 1; 50, FIG. 2; 60, FIG. 3; and 70, FIG. 4) operate in the same manner. In essence, the fluid to be filtered is introduced through the inlet (23, FIG. 1; 52, FIG. 2; 62, FIG. 3; and 72, FIG. 4); enters the cavity, such as 25, FIG. 1; passes through the filter, such as 40, FIG. 1; and exists through the outlet, such as 31, FIG. 1. The contaminants are left on the filter, such as 40, FIG. 1, and may be analyzed or counted by suitable means, such as by microscope, without removal of the filter, such as 40, FIG. 1, from the fluid sampler, such as 10, FIG. 1, through the transparent top, such as 26, FIG. 1. In this connection, it is to be noted that the height of the embodiment, such as 10, FIG. 1, from the viewing surface, such as transparent disc 26, FIG. 1, to the top of the filter disc, such as 40, FIG. 1, is limited by the magnification desired for the analysis or count, e.g., approximately three-eighths inch for 40 power magnification.

While there has been shown and described the fundamental features of the invention, as applied to preferred embodiments, it is to be understood that various substitutions and omissions may be made by those of ordinary skill in the art without departing from the spirit of the invention.

What I claim is:

1. A fluid sampler which permits particulate analysis while the sampler is in an assembled condition, comprising:
   a. a bottom portion, cylinder-like in configuration, open at the upper end and closed at the other end, except for a suitably positioned outlet, and having a cylinder-shaped recess in said other end;
   b. a suitable filter positioned in a flat mode in said recess of said bottom portion;
   c. a top portion cover assembly, including:
      1. a hollow female part, torus-like in configuration, threaded at its lower end on the internal surface, and having a suitably positioned inlet;
      2. a hollow male part, cylinder-like in configuration, open-ended, threaded at its upper end on the external surface, and in threaded connection with said female part;
      3. and, a transparent disc affixed to the inner periphery of said female part, and disposed between said female part and said male part; with said bottom portion and said top portion cover assembly removably united to form a single integrated unit with a cavity therein.

2. A fluid sampler, as set forth in claim 1, wherein said female part and said male part are of aluminum.

3. A fluid sampler, as set forth in claim 1, wherein said female part and said male part are of steel.

4. A fluid sampler, as set forth in claim 1, wherein said transparent disc is of glass.

* * * * *